United States Patent
Rinne

(10) Patent No.: US 7,426,394 B2
(45) Date of Patent: Sep. 16, 2008

(54) METHOD, DEVICE, BASE STATION AND SYSTEM FOR DIRECT UPLINK ACCESS IN A MOBILE COMMUNICATIONS NETWORK

(75) Inventor: Mikko Rinne, Helsinki (FI)

(73) Assignee: Spyder Navigations L.L.C., Wilmington, DE (US)

( * ) Notice: Subject to any disclaimer, the term of this patent is extended or adjusted under 35 U.S.C. 154(b) by 73 days.

(21) Appl. No.: 10/538,977

(22) PCT Filed: Dec. 18, 2003

(86) PCT No.: PCT/FI03/00970

§ 371 (c)(1),
(2), (4) Date: Jun. 14, 2005

(87) PCT Pub. No.: WO2004/057897

PCT Pub. Date: Jul. 8, 2004

(65) Prior Publication Data

US 2006/0068821 A1    Mar. 30, 2006

(30) Foreign Application Priority Data

Dec. 20, 2002    (FI)    ................................. 20022248

(51) Int. Cl.
  *H04Q 7/20*    (2006.01)
(52) U.S. Cl. .................. 455/452.1; 455/453
(58) Field of Classification Search .......... 455/452.1, 455/452.2, 450, 509, 451, 434, 515, 453
See application file for complete search history.

(56) References Cited

U.S. PATENT DOCUMENTS

| | | | |
|---|---|---|---|
| 5,903,843 A * | 5/1999 | Suzuki et al. | 455/452.2 |
| 6,345,066 B1 | 2/2002 | Haartsen | 375/130 |
| 6,963,747 B1 * | 11/2005 | Elliott | 455/450 |
| 6,993,340 B1 * | 1/2006 | Rinne et al. | 455/450 |

(Continued)

FOREIGN PATENT DOCUMENTS

EP    1 089 587 A2    4/2001

(Continued)

OTHER PUBLICATIONS

Khayata, R.E. et al., "A Distributed Medium Access Protocol for Wireless LANs", IEEE, 1995, pp. 238-242.

(Continued)

*Primary Examiner*—Nick Corsaro
*Assistant Examiner*—Shannon R Brooks
(74) *Attorney, Agent, or Firm*—Connolly Bove Lodge & Hutz LLP

(57) ABSTRACT

The invention relates to a method between a communications device (110) and a communications network, which communications network generally provides at least a direct cell access mechanism and an alternative cell access mechanism for the communications device for uplink access to the communications network. The method comprises determining by the communications network and indicating (230) to the communications device (110) whether the direct cell access mechanism can at a given time be provided. This being the case, the communications device can directly start sending user data (150) on a traffic channel. In a situation in which the direct cell access cannot be provided, it is indicated to the communications device that the alternative cell access mechanism should be used.

25 Claims, 5 Drawing Sheets

U.S. PATENT DOCUMENTS

2002/0025812 A1     2/2002    Ahlstrand et al. ........... 455/435
2004/0110521 A1 *   6/2004    Soldani et al. .............. 455/509

FOREIGN PATENT DOCUMENTS

WO        WO 01/86889 A1 * 11/2001
WO        WO 02/17668 A1 *   2/2002

OTHER PUBLICATIONS

Kalliokulju, J. et al., "Radio Access Selection for Multistandard Terminals", IEEE Communications Magazine, Oct. 2001, pp. 116-124.

3GPP TS 25.301, V5.0.0 (Mar. 2002), $3^{rd}$ Generation Partnership Project; Technical Specification Group Radio Access Network; Radio Interface Protocol Architecture (Release 5), pp. 1-43.

* cited by examiner

METHOD, DEVICE, BASE STATION AND SYSTEM FOR DIRECT UPLINK ACCESS IN A MOBILE COMMUNICATIONS NETWORK

FIELD OF THE INVENTION

The invention relates to uplink access in a communications system.

BACKGROUND OF THE INVENTION

One of the problems in the performance of current cellular mobile communications systems is the service access time, i.e. the duration it takes after a user requests a service until the service is delivered. One important contributor to the lengthiness of the service access time is the used cell access mechanism.

FIG. 1 shows the basic principle of a cell access mechanism widely used in the second-generation cellular mobile communications systems. When a terminal 110 has user data to send it transmits to a network an access request message 111 on a Random Access CHannel (RACH) and waits for a response from the network before user data can be transmitted. For example, in GSM GPRS (General Packet Radio Service), an access request message is conveyed via a base station 120 to a base station controller (not shown) which may contain a unit performing radio resource allocation. As a result, an access grant message 121 identifying a dedicated radio transmission resource to be used for user data transmission is transmitted from the network to the terminal 110 on an Access Grant Channel (AGCH). After receipt of the access grant message 121, depending on message contents, the terminal 110 either has to wait for an assigned Uplink State Flag (USF) from the network before it can start sending user data 150 or it can immediately start sending user data 150 on the assigned Traffic Channel (TCH) as identified by the access grant message 121.

The cell access mechanism just described causes a relatively long minimum access delay before any user data can be transmitted. This is due to the fact that radio resources must first be requested before user data transmission can be started. The minimum access delay exists even if the radio resources of the current base station are unoccupied.

Third generation cellular mobile communications systems present improvements to the situation. For example, in a WCDMA system (Wideband Code Division Multiple Access) user data can be transmitted in a RACH message but the amount of user data which call be included in a RACH message is very limited. Although a dedicated traffic channel (DCH) providing more radio resources may subsequently be set up, this is not an ideal solution e.g. for a terminal which would immediately desire to start sending user data at a high data rate.

The WCDMA system also provides a Common Packet CHannel (CPCH) which allows higher data rates but can not support mobility, such as normal handovers or macrodiversity reception (i.e. soft handover).

SUMMARY OF THE INVENTION

According to a first aspect of the invention, there is provided a method between a communications device and a communications network, which communications network generally provides at least a direct cell access mechanism and an alternative cell access mechanism for the communications device for uplink access to the communications network, the method comprising:

determining by the communications network and indicating to the communications device whether the direct cell access mechanism can at a given time be provided.

Preferably, said indicating comprises indicating whether the communications device can directly start sending user data on a traffic channel.

In one embodiment, the determination whether the direct cell access mechanism can be provided is made based on radio and/or traffic measurements performed by a base station.

Preferably, if the direct cell access cannot be provided, the method comprises indicating to the communications device that the alternative cell access mechanism should be used. In one embodiment, the alternative cell access mechanism comprises using a separate access channel, such as RACH, for uplink access.

In one embodiment, said indication is performed by including a particular parameter value in a system information broadcast.

According to a second aspect of the invention, there is provided a communications device configured for operation with a comminations network, which communications network generally provides at least a direct cell access mechanism and an alternative cell access mechanism for the communications device for uplink access to the communications network, the communications device comprising:

means for receiving an indication sent by the communications network, the indication indicating to the communications device whether the direct cell access mechanism can at a given time be provided.

In one embodiment, the communications device is a mobile hand-held device of a cellular communications network.

According to a third aspect of the invention, there is provided a base station of a communications network, which communications network generally provides at least a direct cell access mechanism and an alternative cell access mechanism for a communications device for uplink access to the communications network, the base station comprising:

means for determining and indicating to the communications device whether the direct cell access mechanism can at a given time be provided.

According to a for the aspect of the invention, there is provided a system comprising a communications device and a communications network, which communications network generally provides at least a direct cell access mechanism and an alternative cell access mechanism for the communications device for uplink access to the communications network, the communications network comprising:

means for determining and indicating to the communications device whether the direct cell access mechanism can at a given time be provided; and the communications device comprising:

means for receiving said indication.

Dependent claims contain preferable embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawing in which.

DETAILED DESCRIPTION

Figure 1:
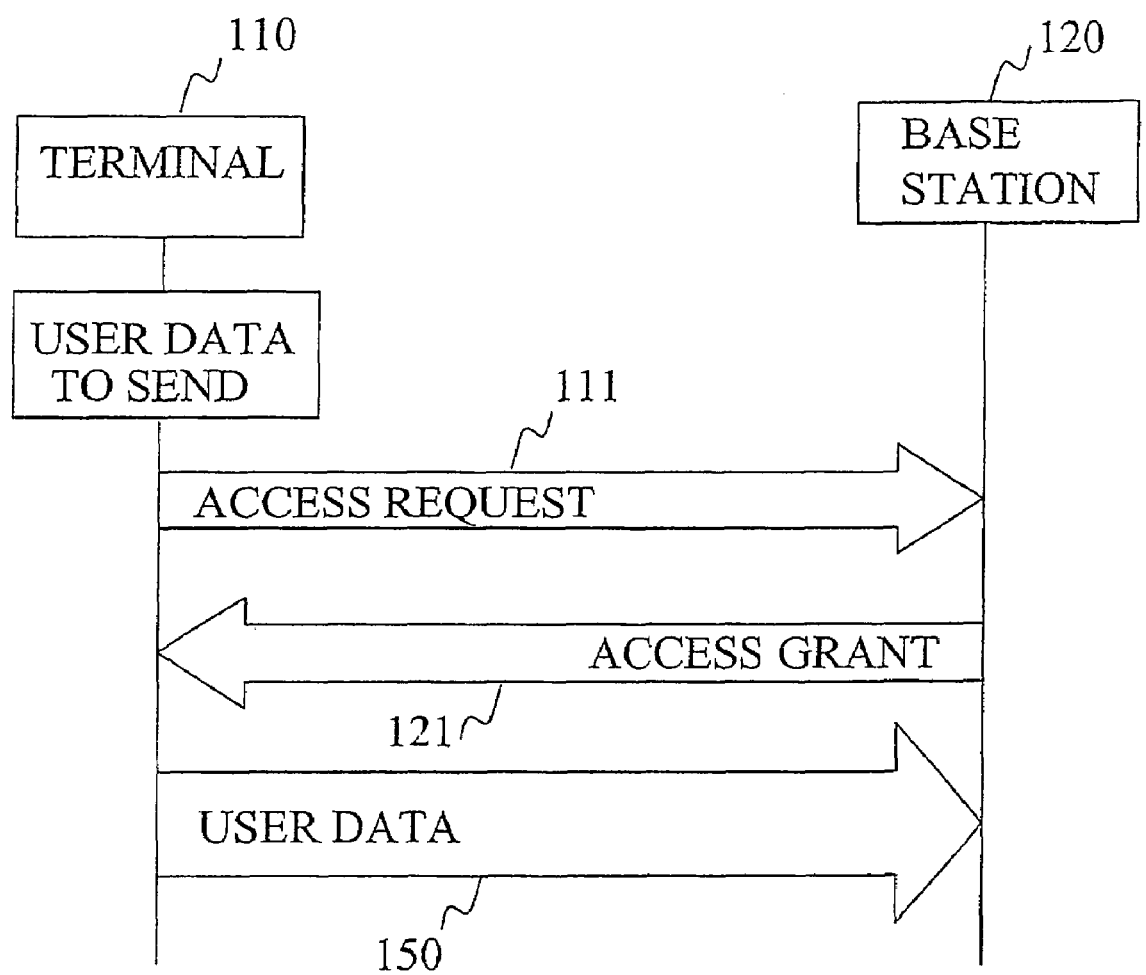
FIG. 1 shows a prior art cell access mechanism.
Figure 2:
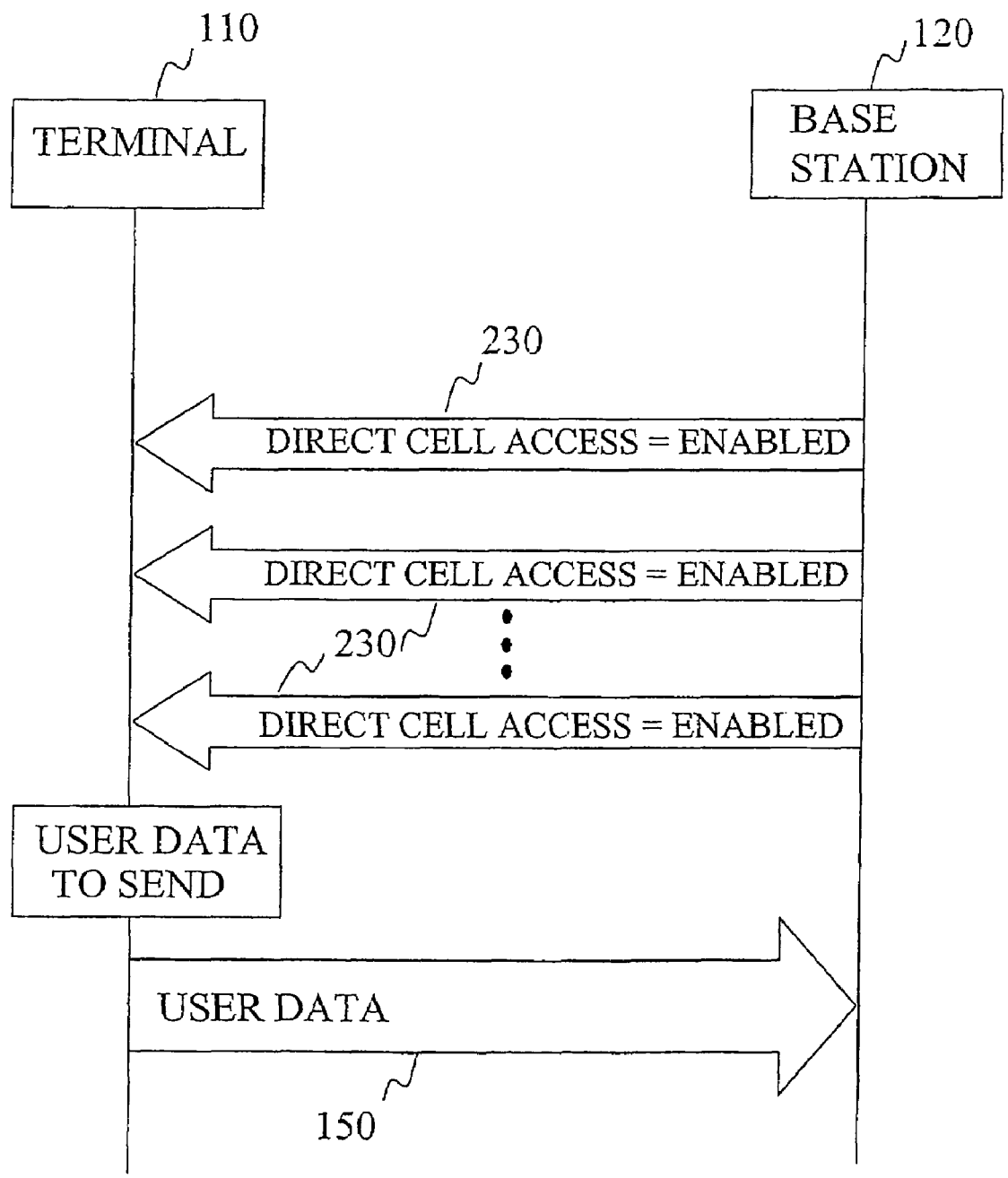
FIGS. 2 and 3 show all embodiment of the invention.
Figure 3:
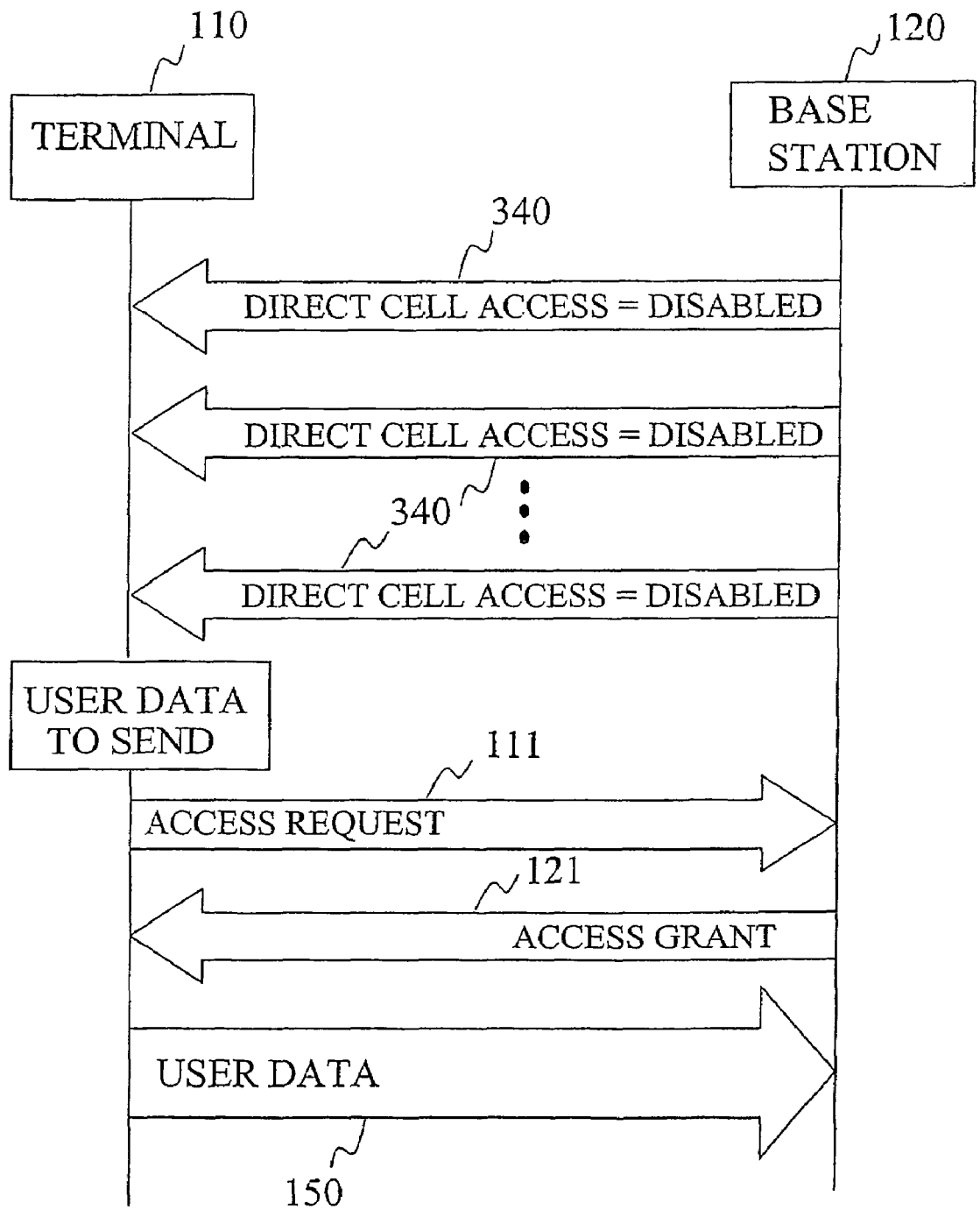

FIGS. 2 and 3 show an embodiment of the invention. In this embodiment, a base station 120 first determines and then signals to a terminal 110 whether direct access to a traffic channel at a particular (high) data rate is permitted or whether an alternative cell access mechanism (with a lower initial data rate) should be used. In this embodiment, the terminal 110 is a mobile terminal and the base station 120 is a base station of a cellular communications network which controls the access to the network in a centralized manner. The mobile terminal 110 and the base station 120 communicate with each other by means of radio frequency communication over an air-interface (radio interface).

The base station 120 continuously performs measurements concerning the cell it is serving. These measurements may involve both radio and traffic measurements. Based on the measurements, the base station 120 gets information on the congestion level of the cell. Based on the congestion level, the base station 120 determines whether a direct uplink access to a traffic channel at a high data rate can be enabled. The base station 120 informs the mobile terminal 110 of the availability of the direct uplink access. For this purpose, a suitable parameter is defined. In this embodiment, this particular parameter is called DirectCellAccess. The parameter has two possible values: Enabled and Disabled. The value Enabled may be indicated by a binary digit "1" and the value Disabled may be indicated by a binary digit "0".

The base station 120 broadcasts system information over the coverage area of the cell it is serving. The broadcasting is effected by sending a broadcast message which is received by terminals residing inside the coverage area of the cell. In this embodiment, the parameter value DirectCellAccess=Enabled or DirectCellAccess=Disabled is broadcasted as a part of the system information broadcast.

If the base station 120 determines that a direct uplink access to a traffic channel can be permitted (empty or lightly loaded cell), it periodically sends the parameter value DirectCellAccess=Enabled as a part of the system information broadcast 230 (FIG. 2) of the cell. The system information broadcast 230 is received by the mobile terminal 110. It reads an updated value of the DirectCellAccess parameter as often as instructed by the parameter(s) in the system information broadcast regulating the update frequency of system information.

If the base station 120 determines that a direct uplink access to a traffic channel cannot be permitted (cell loaded with traffic), it periodically broadcasts the parameter value DirectCellAccess=Disabled in the system information broadcast message 340 (FIG. 3).

When direct uplink access is enabled and the mobile terminal 110 has user data to send, it can directly start sending user data 150 (FIG. 2) on a traffic channel after a synchronization procedure specified by a physical layer (L1) (see FIG. 6 and the corresponding description) has been completed. Information on the traffic channel to be used may be communicated in an appropriate way to the mobile terminal 110. It may, for example, be communicated from the base station 120 beforehand. Also, if the system is a CDMA based system, the appropriate code(s) may be communicated from the base station 120 to the mobile terminal 110 beforehand. The term system is here considered to comprise a combination of appropriate network elements (such as a base station) and terminals.

When direct uplink access is disabled and the mobile terminal 110 has user data to send, it shall not use direct uplink access but an alternative cell access mechanism has to be used. In the embodiment shown in FIG. 3, the alternative method is the two-step cell access mechanism already known as such from the prior art in which the mobile terminal 10 first sends an access request message 111 to the base station 120 and waits for a access grant message 121 from the base station 120 before starting to send user data 150 on a dedicated traffic channel (DCH or similar) as identified by the access grant message 121.

Modifications to the embodiment of the invention just described and other embodiments will be described in the following.

It has been described that the base station 120 periodically sends the parameter value DirectCellAccess=Enabled/Disabled as a part of system information broadcast 230, 340. In one alternative embodiment, the parameter value is sent, instead of a broadcast message, in a particular multicast message which is sent to a limited set of mobile terminals. The set is formed of mobile terminals which in general, based on a user subscription (or similar), have the right to use the direct uplink access. In yet another embodiment, the parameter value DirectCellAccess=Enabled/Disabled is sent as a point-to-point message to each mobile terminal 110 having right to use the direct uplink access. In yet another embodiment, the applicability of the DirectCellAccess parameter to individual terminals is further regulated by another parameter in the system information broadcast. This other parameter can define a certain pseudo-random group of terminals based on the least significant bits of a unique identifier such as subscriber identifier, equipment identifier or similar.

In one embodiment, an expiration time is given by the system to the parameter DirectCellAccess. When e.g. the system information broadcast message is used, the expiration time may be specified as a constant value or as another parameter in the system broadcast message. If the parameter value DirectCellAccess=Enabled, but it has been expired, the mobile terminal 110 may not use the expired parameter value, but has to retrieve a new one before it can start user data transmission according to the direct uplink access mechanism.

It has been described that the base station 120 performs measurements concerning the cell it is servings and that it determines based on these measurements whether the direct uplink access can be enabled. These measurements may involve both radio and traffic measurements. Which of them is/are used depends on the implementation. Typical radio measurements which may be used are, for example, measurement of the received total wide band power, SIR (Signal to Interference Ratio) measurement, BER (Bit Error Rate) measurement, FER (Frame Error Rate) measurement or other measurement on radio signal quality. Especially, the received total wide band power indicates whether there are many users accessing to the uplink direction.

A reader has been given the idea that the base station 120 locally controls the use of radio resources in its cell coverage area by e.g. determining the state of the direct uplink access mechanism. However, it should be clear that the final decision on the radio resources may alternatively be performed by another network element. Decisions are preferably performed by the base station 120, though, since this would reduce the delay experienced by the terminal 110.

A typical environment in which the use of the direct uplink access fits well would be a packet switched system with small cell sizes and short data bursts (e.g. IP packet bursts (Internet Protocol)) and having only little continuous traffic. In a lightly loaded cell, even if there is more than one terminal sending data at a high data rate, collisions are not very likely if the bursts are short. Thus, a high data rate transmission with only a small access delay can be provided to a restricted amount of users without compromising system performance.

Another advantage is that close to all cell uplink capacity can, in certain situations, be used for transfer of user data. For example, if a high data rate user is the only user of the cell, RACH channel capacity might either not be needed at all, or it needs to be reserved only for a new user to register to the cell or to perform handover to the cell. This kind of situation may arise e.g. with a private access point. When direct uplink access to a traffic channel is enabled, only a minimum amount of RACH channel capacity is needed since one user cannot collide and not many other users are expected to access via said access point. The "released" RACH channel capacity may thus be used for transfer of user data.

The basic ideas of the invention are, in principle, applicable to any digital wireless or cellular system with centralized architecture. This includes $2^{nd}$ and $3^{rd}$ generation and possible future generations of cellular systems as well as wireless local area networks, where both low delay and high throughput efficiency are targeted. No restrictions are placed on the general radio access method; it can be e.g. TDMA (time division multiple access) or CDMA (code division multiple access). The system involved may be a multicarrier system, such as an OFDM (Orthogonal Frequency Division Multiplexing) based system as well.

Figure 4:
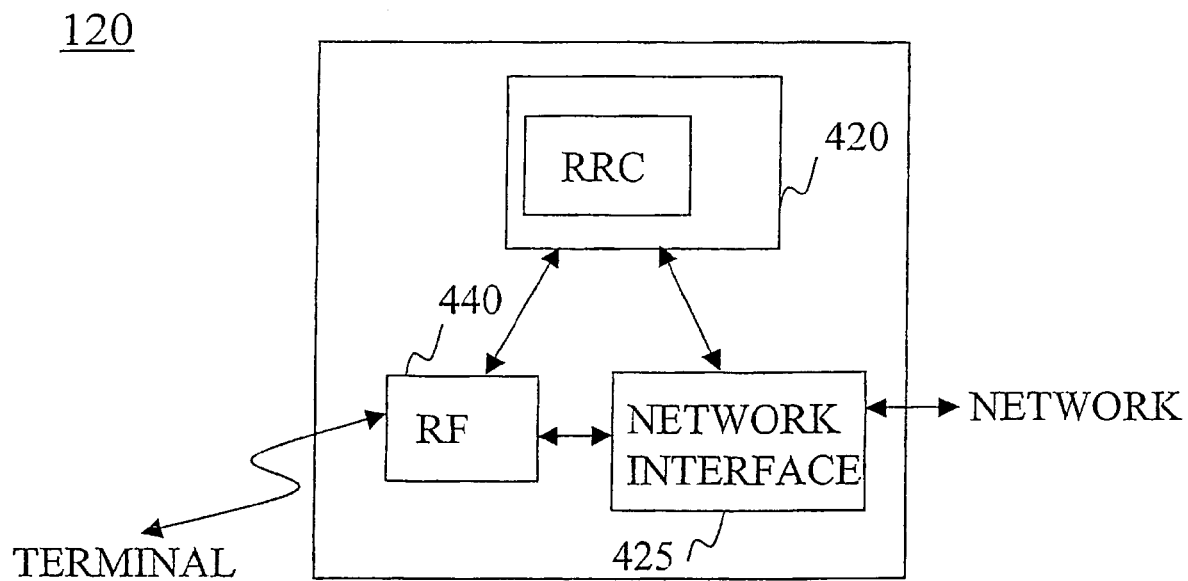
FIG. 4 shows a base station according to an embodiment of the invention.

FIG. 4 shows a base station 120 according to an embodiment of the invention. The base station comprises a processing unit 420, a radio frequency part 440 and a network interface 425. The processing unit 420 controls the operation of the base station 120. The radio frequency part 440 and the network interface 425 are coupled to the processing unit 420. The radio frequency part 440 receives and transmits user data from and to mobile terminals 110 which operate in the area of the cell which the base station 120 serves. Communication to and from the rest of the network is performed via the network interface 425.

The processing unit 420 comprises a Radio Resource Control (RRC) block. The mentioned radio and traffic measurements are performed by the radio frequency part 440 and/or the network interface 425 and analysed by the RRC block. The RRC block makes based on the analysis decisions on whether direct cell access should be enabled or disabled and controls the radio frequency part 440 such that the right parameter value (DirectCellAccess=Enabled/Disabled) is sent at each time to mobile terminals 110 concerned.

In other words, what the base station 120 actually does is that it controls the use of radio resources in the cell by enabling and disabling the usage of a cell access mechanism. Combining this method with other means known from cellular and wireless systems further improves the efficiency of radio resource usage. When the cell is empty or lightly loaded, the base station 120 enables direct sending of user data on high data rate with only a small access delay. When the congestion level in the cell increases, only a slower access mechanism is permitted to be used in order to avoid collisions on the high data rate channel thereby saving radio resources.

Figure 5:
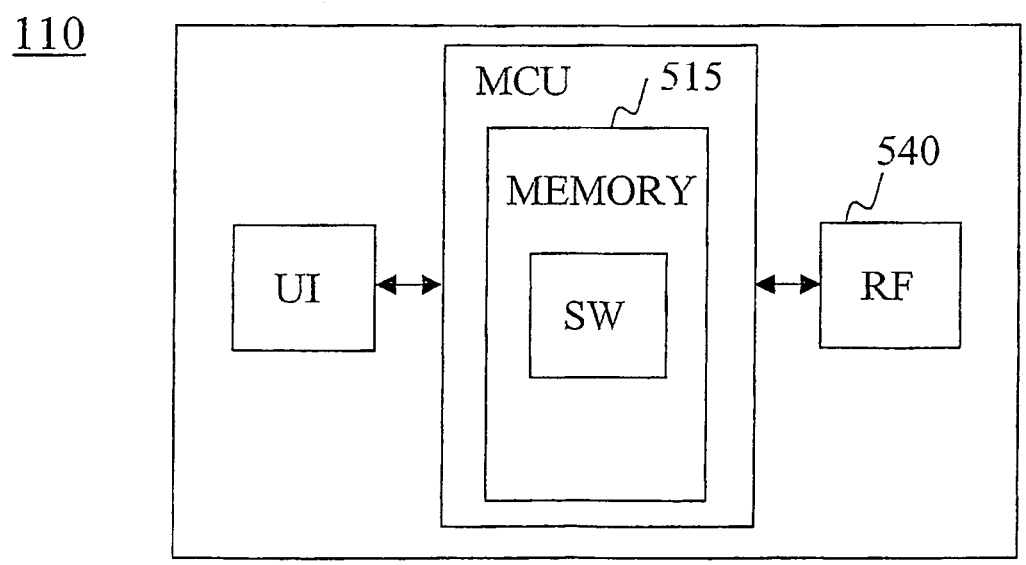
FIG. 5 shows mobile terminal according to an embodiment of the invention.

FIG. 5 shows a mobile terminal 110 according to an embodiment of the invention. In this embodiment, the mobile terminal 110 is a cellular mobile terminal comprising a processing unit MCU, a radio block 540 and a user interface UI. The processing unit MCU controls the operation of the mobile terminal 110 with the aid of software SW. The software SW resides in a memory 515. The radio block 540 and the user interface UI are coupled to the processing unit 420. The radio block 540 receives and transmits user data from and to the base station 120 by means of radio communication over an air-interface. The user interface UT may comprise a keyboard, a display, a microphone and a speaker (not shown) for enabling the user of the mobile terminal 110 to use the terminal 110.

The system information broadcast (or another message) 230, 340 carrying the parameter value DirectCellAccess=Enabled/Disabled is received via the radio block 540 and processed by the processing unit MCU. The software comprises a protocol layer corresponding to the RRC layer of the base station 120. Said protocol layer interprets the received parameter value and controls the radio block 540 so that the right access mechanism (direct cell access or an alternative mechanism) is used.

Figure 6:
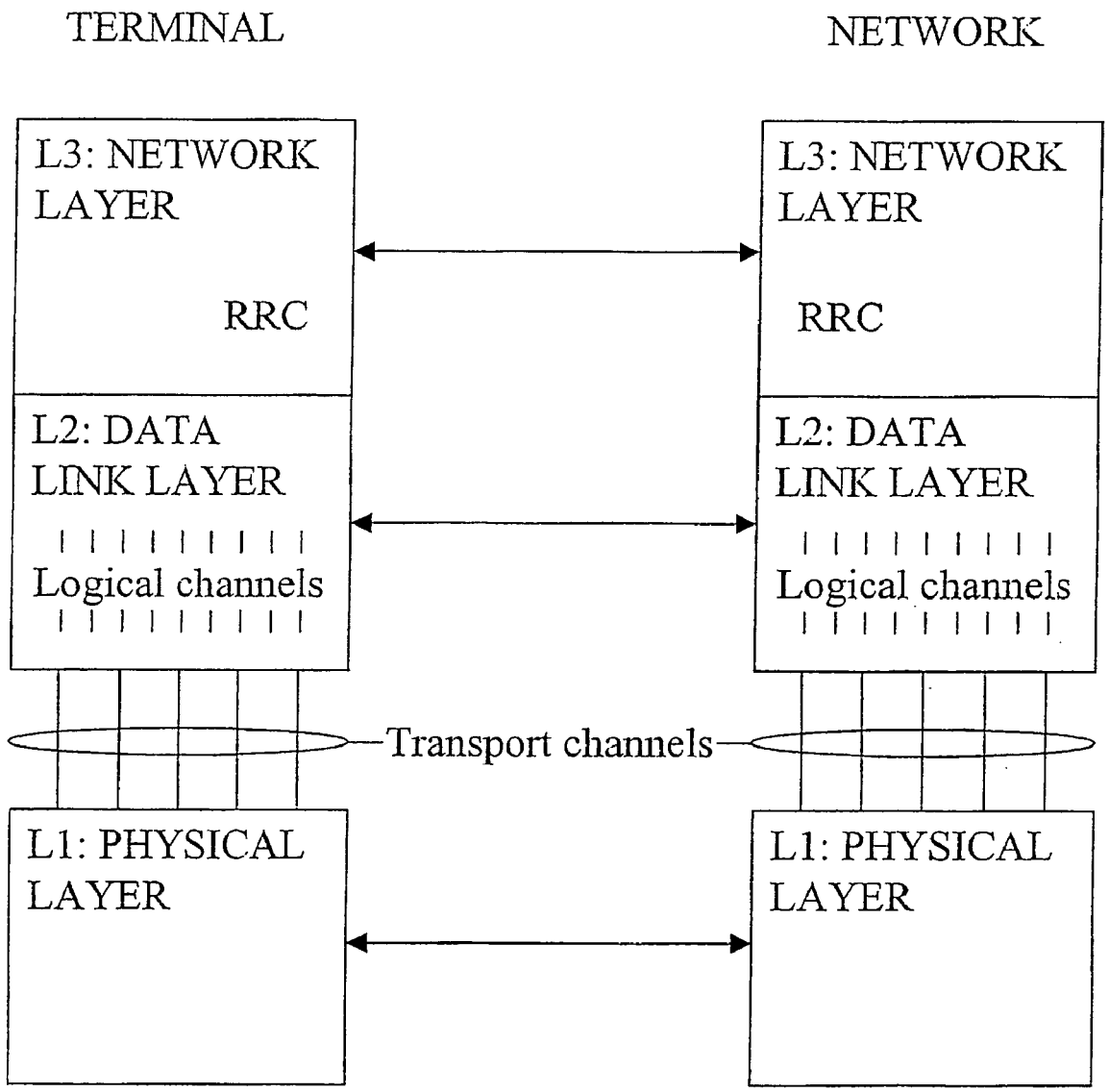
FIG. 6 shows a layered protocol stack in an embodiment of the invention.

FIG. 6 shows how the air-interface (radio interface) between the mobile terminal 110 and the base station 120 (or network) is layered into protocol layers according to the WCDMA system. A protocol stack having three layers is formed. Each protocol layer implemented in the mobile terminal 110 communicates with a corresponding protocol layer implemented in the base station 120 (or network).

The lowest layer is the physical layer (Layer 1 (=L1)). The physical layer provides transport services to higher layers of the protocol stack. It provides transport channels for communication, such as the RACH, CPCH and DCH mentioned in the foregoing description.

The second lowest layer (L2) is the radio link layer. It provides data transfer on logical channels. The logical channels can be divided into control and traffic channels, wherein the control channels are used for transfer of control information only and the traffic channels are used for transfer of user data. Both types of channels are mapped onto the L1 transport channels.

The layer (L3) above the radio link layer is called the network layer. One of its functions in a radio system is radio resource control which is performed by an RRC sublayer.

In one embodiment of the invention, the information on the availability of the direct access mechanism (DirectCellAccess parameter value) is transmitted on the network level (L3). The RRC sublayer is capable of mobility services, such as handovers. Therefore, after high-speed user data transmission has begun in accordance with the direct uplink access mechanism on a traffic channel, the transmission can be continued during a possible handover. This is not possible e.g. with the prior art CPCH method in which transmission has to be stopped if transmission conditions weaken.

The traffic channel on which the mobile terminal 110 can directly start sending user data according to the direct uplink access mechanism, may be defined as a channel on which all the necessary RRC functions can be implemented, i.e. in this case a traffic channel of the radio link layer (L2).

The layers L1, L2 and L3 can be implemented by a suitable combination of hardware and software in the mobile terminal 110 (FIG. 5) and base station 120 (FIG. 4).

Particular implementations and embodiments of the invention have been described. It is clear to a person skilled in the art that the invention is not restricted to details of the embodiments presented above (e.g. the parameter names, the configuration of the protocol layers), but that it can be implemented in other embodiments using equivalent means without deviating from the characteristics of the invention. The scope of the invention is only restricted by the attached patent claims.

The invention claimed is:

1. A method for a system comprising a communications device and a communications network, the method comprising:
    allocating, by the communications network, at least a direct cell access channel for the communications device for uplink access to the communications network, the direct cell access channel to permit the communications device to directly start sending user data on the direct cell access channel without requesting access resources when user data is available to send;
    providing an alternative uplink transmission mechanism for the communication device to send data to the communications network if the direct cell access channel cannot be provided;
    determining by the communications network conditions when the direct cell access channel is available for use at a given time;
    providing the communications device with a periodic availability message indication of the availability for use of the direct cell access channel during said conditions; and
    permitting reception of a transmission from the communications device without a channel request during said availability.

2. A method according to claim 1, wherein in a situation in which the direct cell access can not be provided the method comprises:
    indicating to the communications device that the alternative cell access mechanism should be used.

3. A method according to claim 2, wherein the alternative cell access mechanism comprises using a separate access channel for uplink access.

4. A method according to claim 1, wherein a radio interface between the mobile communications device and the communication network is layered into protocol layers which form a protocol stack, and the direct cell access channel forms part of a logical traffic channel operating on a data link layer (Layer 2) of the protocol stack.

5. A method according to claim 4, wherein said providing a periodic availability message is carried out on a network layer (Layer 3) of the protocol stack.

6. A method according to claim 1, wherein said providing a periodic availability message is performed by sending a broadcast message to a set of communications devices including said communications device.

7. A method according to claim 6, wherein said broadcast message contains a parameter value further restricting the set of communications devices.

8. A method according to claim 1, wherein said providing a periodic availability message is performed by sending a multicast message to a limited set of communications devices including said communications device.

9. A method according to claim 1, wherein said providing a periodic availability message is performed by sending a point-to-point message to the communications device.

10. A method according to claim 6, wherein said message conveys to said communications device a parameter value indicating whether the direct cell access channel is enabled.

11. A method according to claim 1, wherein the communications network comprises a base station serving a cell of a mobile communications system, and wherein the method comprises:
    performing one or more traffic and/or radio measurements by the base station; and
    determining by the base station whether the direct cell access channel can, at a given time, be provided to the communications device, on the basis of said measurements.

12. A base station of a communications network, comprising:
    means for allocating at least a direct cell access channel to a communications device, the direct cell access channel to enable the communications device to directly start transmitting data on the direct cell access channel without first requesting access resources when the communications device has data to be sent;
    means for providing an alternative cell access mechanism for the communications device for uplink access to the communications network if the direct cell access channel cannot be provided;
    means for determining by the communications network conditions when the direct cell access channel is available for use at a given time;
    means for providing the communications device with a periodic broadcast message indication of the availability for use of the direct cell access channel during said conditions; and
    means for permitting reception of a transmission from the communications device without a channel request during said availability.

13. A system comprising a communications device and a communications network, the communications network comprising:
    means for allocating at least a direct cell access channel to a communications device, the direct cell access channel to enable the communications device to directly start transmitting data on the direct cell access channel without first requesting access resources when the communications device has data to be sent;
    means for providing an alternative cell access mechanism for the communications device for uplink access to the communications network if the direct cell access channel cannot be provided;
    means for determining by the communications network conditions when the direct cell access channel is available for use at a given time;
    means for providing the communications device with a periodic broadcast indication of the availability for use of the direct cell access channel during said conditions; and
    means for permitting reception of a transmission from the communications device without a channel request during said availability; and
    the communications device comprising:
    means for receiving said indication.

14. An apparatus, comprising:
    a module to allocate to a communications device at least a direct cell access channel to permit the communications device to directly start sending uplink data to a communications network on the direct cell access channel without requesting access resources when uplink data is available to send;
    a module to provide to the communications device an alternative cell access mechanism for uplink access to the communications network when the direct cell access channel cannot be provided; and
    a determination module to determine conditions when, at a given time, the direct cell access channel can be provided; and a transmitter to provide to the communications device a periodic broadcast message indication of the availability of the direct cell access channel during said conditions; and a receiver to receive a transmission from the communications device without a channel request during said availability.

15. An apparatus according to claim 14, wherein the apparatus is configured to operate as a base station of the communications network.

16. An apparatus according to claim 14, wherein, in a situation in which the direct cell access channel can not be provided, the apparatus is configured to indicate to the communications device that the alternate cell access mechanism should be used.

17. An apparatus according to claim 14, wherein the alternative cell access mechanism comprises using a separate access channel for uplink access.

18. An apparatus according to claim 14, wherein said availability message comprises an indication of whether the communications device can directly start sending user data on the direct cell access channel at a high data rate.

19. An apparatus according to claim 14, wherein a radio interface between the apparatus and the communications device is layered into protocol layers which form a protocol stack, and the direct cell access channel forms part of a logical traffic channel operating on a data link layer (Layer 2) of the protocol stack.

20. An apparatus according to claim 19, wherein said transmitter is to provide the periodic availability message using a network layer (Layer 3) of the protocol stack.

21. An apparatus according to claim 14, wherein the availability message comprises a broadcast message, a multicast message, or point-to-point message(s).

22. An apparatus according to claim 14, wherein the availability message comprises a broadcast message, and wherein said broadcast message contains a parameter value restricting a set of communications devices to which the message is to be transmitted.

23. An apparatus according to claim 14, wherein the availability message comprises a message comprising a parameter value indicating whether the direct cell access channel is enabled.

24. An apparatus according to claim 14, wherein the apparatus is configured to operate as a base station of the communications network, and wherein the determination module is to perform traffic and/or radio measurements and to determine whether the direct cell access can, at a given time, be provided on the basis of said measurements.

25. A method according to claim 1, wherein, in the alternative cell access mechanism, a two step process occurs in which the communications device first requests access to the communications network.

* * * * *

UNITED STATES PATENT AND TRADEMARK OFFICE
CERTIFICATE OF CORRECTION

PATENT NO. : 7,426,394 B2 Page 1 of 1
APPLICATION NO. : 10/538977
DATED : September 16, 2008
INVENTOR(S) : Mikko J. Rinne It is certified that error appears in the above-identified patent and that said Letters Patent is hereby corrected as shown below:

Column 2, line 43, reads "According to a for the aspect of the invention, there is", it should read --According to a fourth aspect of the invention, there is--.

In the Claims:

Claim 12, column 8, line 23, reads "periodic broadcast message indication of the availability", it should read --periodic availability message indication of the availability--.

Claim 13, column 8, line 46, reads "periodic broadcast indication of the availability for use", it should read --periodic availability indication of the availability for use--.

Claim 14, column 9, line 2, reads "periodic broadcast message indication of the availability", it should read --periodic availability message indication of the availability--.

Signed and Sealed this

Seventh Day of April, 2009

JOHN DOLL
*Acting Director of the United States Patent and Trademark Office*